United States Patent
Camp et al.

(10) Patent No.: US 11,294,659 B2
(45) Date of Patent: *Apr. 5, 2022

(54) CENTRALIZED CLIENT APPLICATION MANAGEMENT

(71) Applicant: eBay Inc., San Jose, CA (US)

(72) Inventors: Roy Leon Camp, San Jose, CA (US); Gireesh Sreepathi, San Jose, CA (US); Hui Chen, San Jose, CA (US); Frederik van Voorden, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,631

(22) Filed: Mar. 17, 2020

(65) Prior Publication Data

US 2020/0285459 A1    Sep. 10, 2020

Related U.S. Application Data

(63) Continuation of application No. 14/950,012, filed on Nov. 24, 2015, now Pat. No. 10,649,756.

(Continued)

(51) Int. Cl.
*H04L 29/06* (2006.01)
*H04L 29/08* (2006.01)
(Continued)

(52) U.S. Cl.
CPC ............... *G06F 8/65* (2013.01); *G06F 8/60* (2013.01); *G06F 9/44505* (2013.01); *H04L 67/34* (2013.01); *H04W 4/50* (2018.02)

(58) Field of Classification Search
CPC . G06F 8/65; G06F 8/60; G06F 1/3203; G06F 1/3287; G06F 9/44505;
(Continued)

(56) References Cited

U.S. PATENT DOCUMENTS

| | | |
|---|---|---|
| 7,568,018 B1 | 7/2009 | Hove et al. |
| 8,474,013 B2 | 6/2013 | Fletcher |

(Continued)

FOREIGN PATENT DOCUMENTS

| | | |
|---|---|---|
| CN | 1859177 A | 11/2006 |
| CN | 102025860 A | 4/2011 |

(Continued)

OTHER PUBLICATIONS

University of Wisconsin System, How to Kill a Stuck Client Remote App Session, 7 pages (Year: 2017).*

(Continued)

*Primary Examiner* — Thuy Dao
(74) *Attorney, Agent, or Firm* — Shook, Hardy & Bacon LLP

(57) ABSTRACT

Systems and methods for centralized client application management are provided. In an example embodiment, device data is received from a user device. The user device is identified according to an identification rule. A client state is received from the user device. A match between the client state and a specified state is determined. Based on the client state matching the specified state, an instruction to be performed on the user device is generated. The instruction is caused to be performed on the user device. The instruction causes a change to the client state stored on the user device.

20 Claims, 10 Drawing Sheets

Related U.S. Application Data

(60) Provisional application No. 62/085,136, filed on Nov. 26, 2014.

(51) Int. Cl.
| | |
|---|---|
| *G06F 21/60* | (2013.01) |
| *H04L 9/32* | (2006.01) |
| *H04L 9/08* | (2006.01) |
| *G06F 21/00* | (2013.01) |
| *G06F 8/65* | (2018.01) |
| *H04L 67/00* | (2022.01) |
| *H04W 4/50* | (2018.01) |
| *G06F 9/445* | (2018.01) |
| *G06F 8/60* | (2018.01) |

(58) Field of Classification Search
CPC ...... G06F 1/206; G06F 1/324; G06F 21/6218; H04W 12/06; H04W 4/50; Y02D 10/171; Y02D 10/00; H04L 67/34; H04L 67/12; H04L 67/10; H04L 63/1416; H04L 63/0428; H04L 63/20
See application file for complete search history.

(56) References Cited

U.S. PATENT DOCUMENTS

| | | | |
|---|---|---|---|
| 8,484,646 B1 | 7/2013 | Saeed | |
| 8,595,810 B1 | 11/2013 | Ben Ayed | |
| 8,613,070 B1 | 12/2013 | Borzycki et al. | |
| 8,738,934 B2 | 5/2014 | Lurey et al. | |
| 8,739,249 B1 | 5/2014 | Kay et al. | |
| 8,849,979 B1 | 9/2014 | Qureshi | |
| 9,015,505 B2* | 4/2015 | Tabone | G06F 1/3203 713/320 |
| 9,188,976 B1 | 11/2015 | Kim et al. | |
| 9,930,033 B2 | 3/2018 | Chhabra et al. | |
| 10,333,712 B2 | 6/2019 | Lu et al. | |
| 10,649,756 B2 | 5/2020 | Camp et al. | |
| 2004/0187023 A1* | 9/2004 | Alagna | G06F 21/56 726/24 |
| 2005/0049973 A1* | 3/2005 | Read | G06F 21/10 705/59 |
| 2006/0182055 A1* | 8/2006 | Coffee | H04L 67/04 370/328 |
| 2008/0052395 A1 | 2/2008 | Wright et al. | |
| 2008/0127190 A1 | 5/2008 | Shu et al. | |
| 2009/0124375 A1 | 5/2009 | Patel | |
| 2010/0107150 A1 | 4/2010 | Kamada et al. | |
| 2010/0279675 A1 | 11/2010 | Slack et al. | |
| 2012/0060213 A1* | 3/2012 | Childress | G06F 21/31 726/18 |
| 2012/0260232 A1 | 10/2012 | Hirsch et al. | |
| 2013/0121580 A1* | 5/2013 | Chen | G06Q 10/063 382/182 |
| 2013/0167224 A1 | 6/2013 | Horiuchi et al. | |
| 2013/0173787 A1 | 7/2013 | Tateishi et al. | |
| 2014/0020070 A1 | 1/2014 | Angal | |
| 2014/0245286 A1* | 8/2014 | Wong | G06F 8/62 717/174 |
| 2014/0295821 A1 | 10/2014 | Qureshi | |
| 2014/0297838 A1 | 10/2014 | Qureshi | |
| 2014/0298403 A1 | 10/2014 | Qureshi | |
| 2014/0298432 A1 | 10/2014 | Brown | |
| 2015/0095823 A1 | 4/2015 | Brewer et al. | |
| 2015/0223056 A1* | 8/2015 | Ludwig | G16H 10/60 455/411 |
| 2015/0324184 A1 | 11/2015 | Foley et al. | |
| 2015/0363774 A1 | 12/2015 | Priebatsch et al. | |
| 2016/0147526 A1 | 5/2016 | Camp et al. | |

FOREIGN PATENT DOCUMENTS

| | | |
|---|---|---|
| CN | 103401731 A | 11/2013 |
| CN | 107003872 A | 8/2017 |
| WO | 2016/086091 A1 | 6/2016 |

OTHER PUBLICATIONS

Amendment Under 37 CFR 1.312 filed on Mar. 4, 2020 for U.S. Appl. No. 14/950,012, 9 pages.
Applicant Initiated Interview Summary received for U.S. Appl. No. 14/950,012, dated Sep. 28, 2018, 4 pages.
Applicant Initiated Interview Summary received for U.S. Appl. No. 14/950,012, dated Aug. 30, 2017, 3 pages.
Applicant Initiated Interview Summary received for U.S. Appl. No. 14/950,012, dated Feb. 23, 2018, 3 pages.
Corrected Notice of Allowability received for U.S. Appl. No. 14/950,012, dated Mar. 25, 2020, 3 Pages.
Final Office Action received for U.S. Appl. No. 14/950,012, dated Aug. 10, 2017, 23 pages.
Final Office Action received for U.S. Appl. No. 14/950,012, dated Aug. 23, 2019, 17 pages.
First Action Interview—Pre-Interview Communication received for U.S. Appl. No. 14/950,012, dated Aug. 22, 2016, 14 pages.
First Action Interview—Office Action Summary received for U.S. Appl. No. 14/950,012, dated Mar. 9, 2017, 7 pages.
Non-Final Office Action received for U.S. Appl. No. 14/950,012, dated Jul. 16, 2018, 32 pages.
Non-Final Office Action received for U.S. Appl. No. 14/950,012, dated Dec. 22, 2017, 28 Pages.
Non-Final Office Action received for U.S. Appl. No. 14/950,012, dated Mar. 11, 2019, 14 pages.
Notice of Allowance received for U.S. Appl. No. 14/950,012, dated Dec. 17, 2019, 10 pages.
Response to Final Office Action filed on Nov. 21, 2019 for U.S. Appl. No. 14/950,012, dated Aug. 23, 2019, 10 Pages.
Response to Final Office Action filed on Oct. 6, 2017 for U.S. Appl. No. 14/950,012, dated Aug. 10, 2017, 10 pages.
Response to First Action Interview—Pre-Interview Communication filed on Sep. 22, 2016, for U.S. Appl. No. 14/950,012, dated Aug. 22, 2016, 1 page.
Response to First Action Interview—Office Action filed on May 9, 2017, for U.S. Appl. No. 14/950,012, dated Mar. 9, 2017, 10 pages.
Response to Non-Final Office Action filed on Mar. 7, 2018, for U.S. Appl. No. 14/950,012, dated Dec. 22, 2017, 14 pages.
Response to Non-Final Office Action filed on Jun. 28, 2019 for U.S. Appl. No. 14/950,012, dated Mar. 11, 2019, 12 pages.
Response to Non-Final Office Action filed on Nov. 15, 2018, for U.S. Appl. No. 14/950,012, dated Jul. 16, 2018, 15 pages.
Communication Pursuant to Article 94(3) EPC received for European Patent Application No. 15864039.1, dated Apr. 15, 2020, 9 Pages.
Final Office Action received for Korean Patent Application No. 10-2017-7017398, dated Nov. 25, 2019, 7 pages (4 pages of Official copy and 3 pages of English Translation).
Office Action received for Korean Patent Application No. 10-2017-7017398, dated Nov. 8, 2018, 9 pages (6 pages of Official Copy and 3 pages of English Translation).
Office Action received for Korean patent Application No. 2017-7017398, dated May 21, 2019, 8 pages (6 pages official copy and 2 pages English translation).
Response to Office Action filed on Jul. 22, 2019 for Korean Patent Application No. 10-2017-7017398 dated May 21, 2019, 12 pages (3 pages English translation 9 pages official copy).
Response to Office Action filed on Jan. 7, 2019, for Korean Patent Application No. 10-2017-7017398, dated Nov. 8, 2018, 23 pages (8 pages of English Translation and 15 pages of Official Copy).
Response to Office Action filed on Jan. 22, 2020 for Korean Patent Application No. 10-2017-7017398, dated Nov. 25, 2019, 25 pages (21 pages of official copy & 4 pages of English Translation of claims).

(56) References Cited

OTHER PUBLICATIONS

International Written Opinion received for PCT Application No. PCT/US2015/062592 dated Jan. 29, 2016, 6 pages.
Extended European Search Report received for European Patent Application No. 15864039.1 dated Nov. 12, 2018, 12 pages.
Partial Supplementary European Search Report received for European Patent Application No. 15864039.1 dated Jul. 2, 2018, 12 pages.
Response to European Search Report filed on May 24, 2019 for European Patent Application No. 15864039.1, dated Nov. 12, 2018, 9 pages.
Office Action received for Chinese Patent Application No. 201580064260.8, dated Sep. 23, 2019, 12 pages (5 pages of Official Copy and 7 pages of English Translation).
Response to Office Action filed on Dec. 5, 2019 for Chinese Patent Application No. 201580064260.8, dated Sep. 23, 2019, 13 pages (9 pages of Official Copy & 4 Pages of English translation of claims).
Handte et al., "iScreen: A Toolkit for Interactive Screens", Proceedings of the International Symposium on Pervasive Displays, Jun. 2012, 6 pages.
International Preliminary Report on Patentability received for PCT Application No. PCT/US2015/062592, dated Jun. 8, 2017, 8 pages.
International Search Report received for PCT Patent Application No. PCT/US2015/062592, dated Jan. 29, 2016, 2 pages.
Summons to Oral Proceedings received for European Patent Application No. 15864039.1, dated Dec. 17, 2021, 6 pages.

\* cited by examiner

CENTRALIZED CLIENT APPLICATION MANAGEMENT

CROSS REFERENCES

The present application for patent claims priority to U.S. patent application Ser. No. 14/950,012 by Camp et al., entitled "Centralized Client Application Management", filed Nov. 24, 2015, which claims priority to U.S. Provisional Application No. 62/085,136 by van Voorden et al., entitled "Centralized Client Application Management," filed Nov. 26, 2014, each of which is assigned to the assignee hereof, and expressly incorporated by reference herein.

TECHNICAL FIELD

Embodiments of the present disclosure relate generally to mobile computing technology and, more particularly, but not by way of limitation, to centralized client application management.

BACKGROUND

Smart phones, tablet computers, and other smart devices have become increasingly popular among consumers. These devices allow consumers to download and install a variety of applications (also referred to as "apps") submitted by third party developers to a centralized application store (also referred to as an "app store"). The submission process can include an approval process that can delay, for days or even weeks, release of a submitted app to consumers. These delays can be detrimental when an urgent update or change to a particular application is desired.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
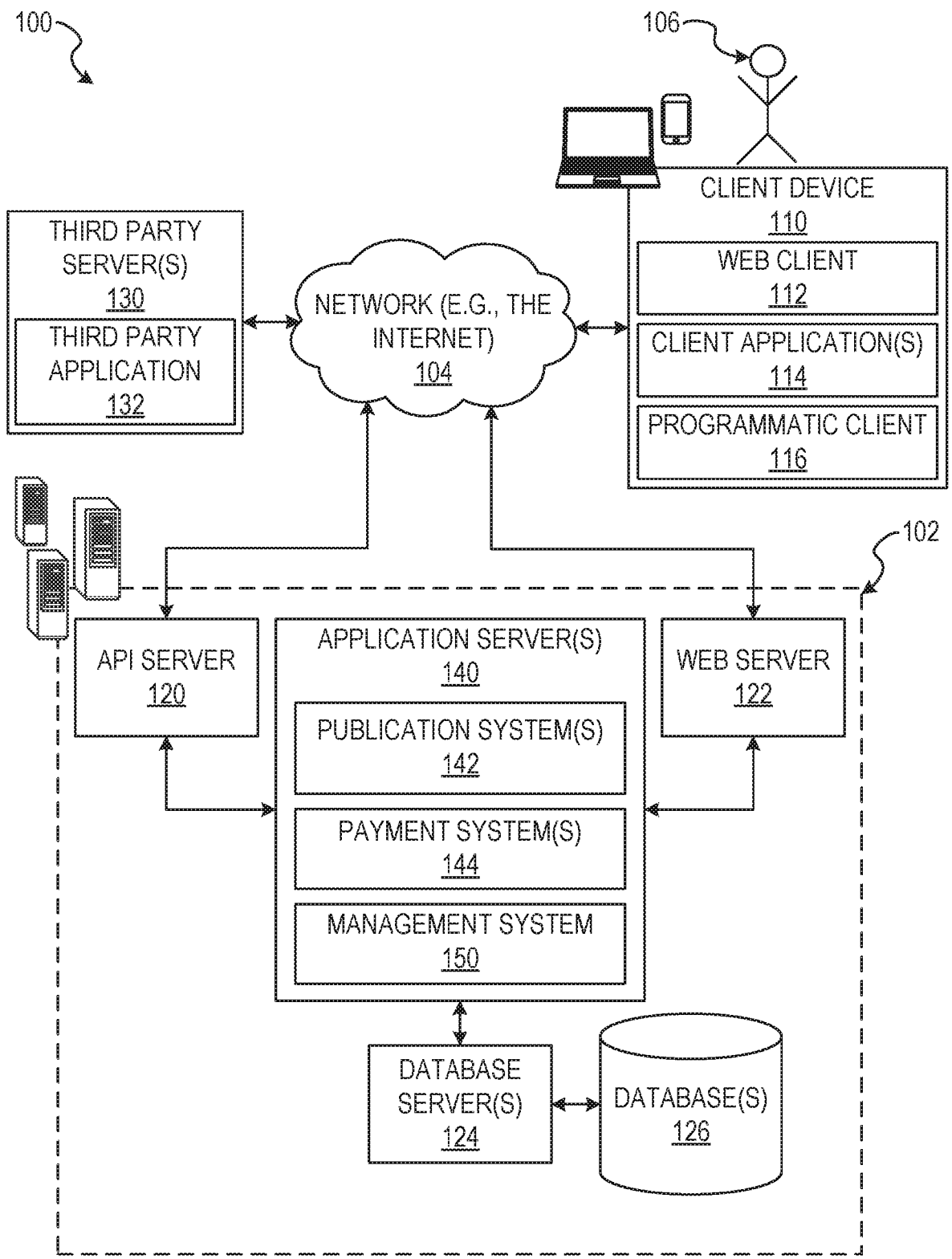
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Users of smart phones, tablets, and the like can download and install apps submitted by third party developers to a digital distribution platform (e.g., an app store such as GOOGLE® PLAY, APP STORE, WINDOWS® STORE). When a third party developer submits a particular app or an update for a particular app to an app store, there is typically a delay between submission and the particular app or the update for the particular app becoming available to users. This delay is often due to an approval process that can include various compliance testing implemented by a host of the app store. In a scenario where an urgent update to a particular app is desired, such a delay in the update becoming available can create difficulties for developers and users of a particular app. For example, the delay can be detrimental when a security breach (e.g., sensitive credential data being exposed) associated with an app can be resolved via an update of the app. In this example, the shorter the delay for updating the app, the less exposure users of the app have to the security breach.

Another issue that can arise when performing a mass update of a particular app (e.g., an update involving millions of devices) is storing a state for each device of a large number of devices. Storing a state for each device on a server can be challenging when there are a large number of client devices. In various embodiments, techniques are described to store a state at the client device and communicate the state to the server for subsequent analysis or actions. In this way, the state is distributed across the client devices rather than centrally stored at a server. Such a scheme avoids issues that can arise from working with a large number of devices as is typical for mobile apps.

To avoid issues created by a delayed release of an update or change to a client app submitted to an app store, systems and methods for centralized client application management are provided. In various example embodiments, device data is received at a management server from one or more user devices. For example, a management Software Development Kit (SDK) or library is included in the client app submitted to the app store. When the client app executes on the user device, the client app initializes the SDK and provides the device data to the management server (e.g., operating system, apps installed, device model, device identifier, app version). Once the device data is received at the management server, the management server identifies the user device according to an identification rule. The identification rule is associated with the device data. For instance, the management server may identify user devices that are running a particular version of a particular application.

After the management server identifies the user device, the management server receives a client state from the user device. The management server then generates an instruction based on the client state of the user device. For instance, if the client state indicates that a particular user device has not performed a password reset flow, the management server generates an instruction comprising a password reset flow instruction (e.g., an instruction that directs, guides, or forces the user device to perform the password reset flow). Once the management server generates the instruction, the management server causes performance of the instruction on the identified user device. The instruction can cause a change to the client state stored on the identified user device. For example, the instruction can comprise presenting a process flow (e.g., a user interface or a series of user interfaces that guides the user to perform a particular action or set of actions such as a password reset) on a user interface of the user device. In this example, the management server causes performance of the instruction by causing presentation of a user interface rendered on top of an executing app of the user device that includes a process flow.

With reference to FIG. 1, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1 illustrates, for example, a web client 112 (e.g., a browser, such as the INTERNET EXPLORER® browser developed by MICROSOFT® Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a World-wide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not be part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 can host one or more publication system(s) 142, payment system(s) 144, and a management system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

In some implementations, the management system 150 provides functionality to centralized client application management. In some example embodiments, the management system 150 communicates with the client device 110, the third party server(s) 130, the publication system(s) 142, and the payment system(s) 144. In an alternative example embodiment, the management system 150 is a part of the publication system(s) 142. The management system 150 will be discussed further in connection with FIG. 2 below.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 and the payment system(s) 144) can also be implemented as standalone software programs, which do not necessarily have networking capabilities.

Figure 2:
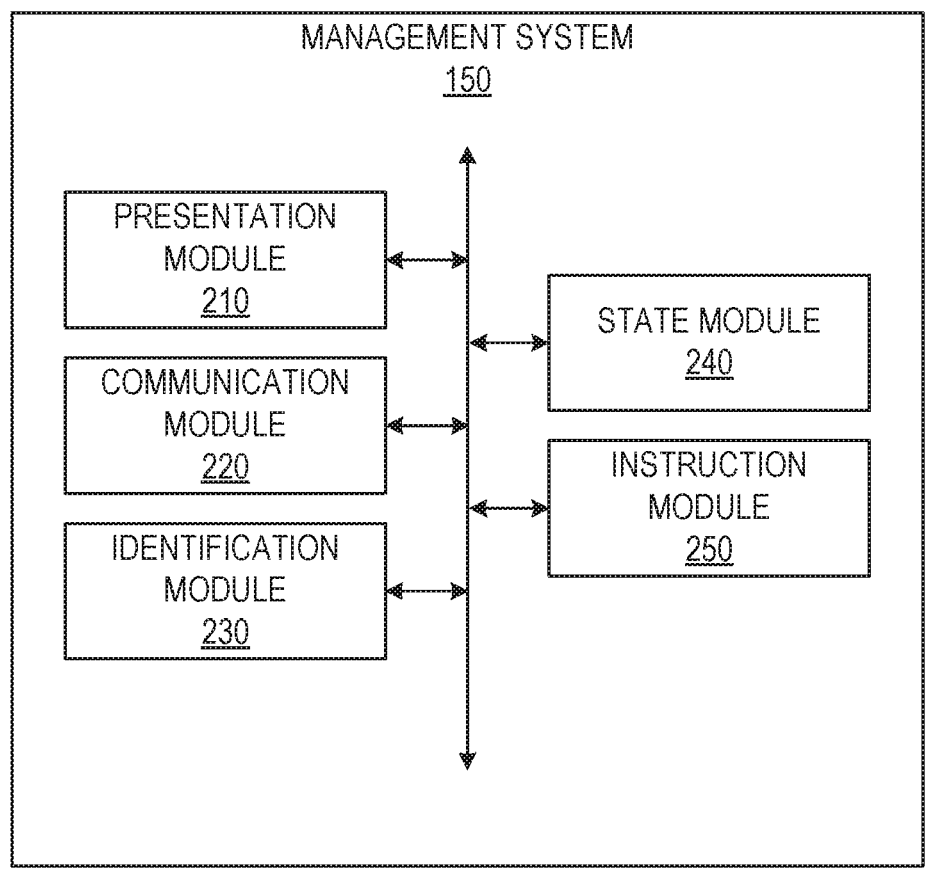
FIG. 2 is a block diagram illustrating an example embodiment of a management system, according to some example embodiments.

FIG. 2 is a block diagram of the management system 150 that provides functionality for centralized client application management. In an example embodiment, the management system 150 includes a presentation module 210, a communication module 220, an identification module 230, a state module 240, and an instruction module 250. All, or some, of the modules 210-250 of FIG. 2, communicate with each other, for example, via a network coupling, shared memory, and the like. It will be appreciated that each module can be implemented as a single module, combined into other modules, or further subdivided into multiple modules. Other modules not pertinent to example embodiments can also be included, but are not shown.

The presentation module 210 provides various presentation and user interface functionality operable to interactively present (or cause presentation) and receive information from the user. Interactively presenting information is intended to include the exchange of information between a particular device and the user. The user may provide input to interact with the user interface in many possible manners, such as, alphanumeric, point based (e.g., cursor), tactile, other input (e.g., touch screen, tactile sensor, light sensor, infrared sensor, biometric sensor, microphone, gyroscope, accelerometer, or other sensors), and the like. It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the networked system 102, the client device 110, and the third party server(s) 130. In various example embodiments, the network communication can operate over wired or wireless modalities. Web services are intended to include retrieving information from the third party server(s) 130, the database(s) 126, and the application server(s) 140. In some implementations, information retrieved by the communication module 220 comprises data associated with the user (e.g., user profile information from an online account, social network service data associated with the user), data associated with one or more items listed on an e-commerce website (e.g., images of the item, reviews of the item, item price), or other data to facilitate the functionality described herein.

The identification module 230 provides functionality to identify one or more user devices among a plurality of user devices based on device data received from respective user devices of the plurality of user devices. For instance, the identification module 230 can identify a set of user devices running a particular operating system, a version of a particular app, locale, and so forth.

The state module 240 provides functionality to retrieve, store, or cause storage of a client state of a user device. For example, the state module 240 retrieves client state data stored on the user device. In some embodiments, the state module 240 changes or causes a change in the client state stored at the client device. For instance, once a particular notification or message is received by a particular user device, the state module 240 updates or causes an update of the client state to indicate that the particular user device has received the particular notification or message at least once.

The instruction module 250 provides functionality to generate an instruction to be performed on the user device (e.g., the user device 110). The instruction can be adapted for a particular device based on the device data of the user device. For example, the instruction can comprise a process flow such as resetting a password for an online account associated with a particular app on the user device. In other examples, the instruction comprises a reset of app data (e.g., locally stored settings for the client app), a message or notification (e.g., a down for maintenance message that is localized to the user device language), maintenance actions (e.g., adjusting a particular privacy setting), a forced logout of a user (e.g., the user 106) from an online account associated with the client app (e.g., the client app 114), a change in access to a particular feature of the client app (e.g., enable or disable a particular feature), and so on.

Figure 3:
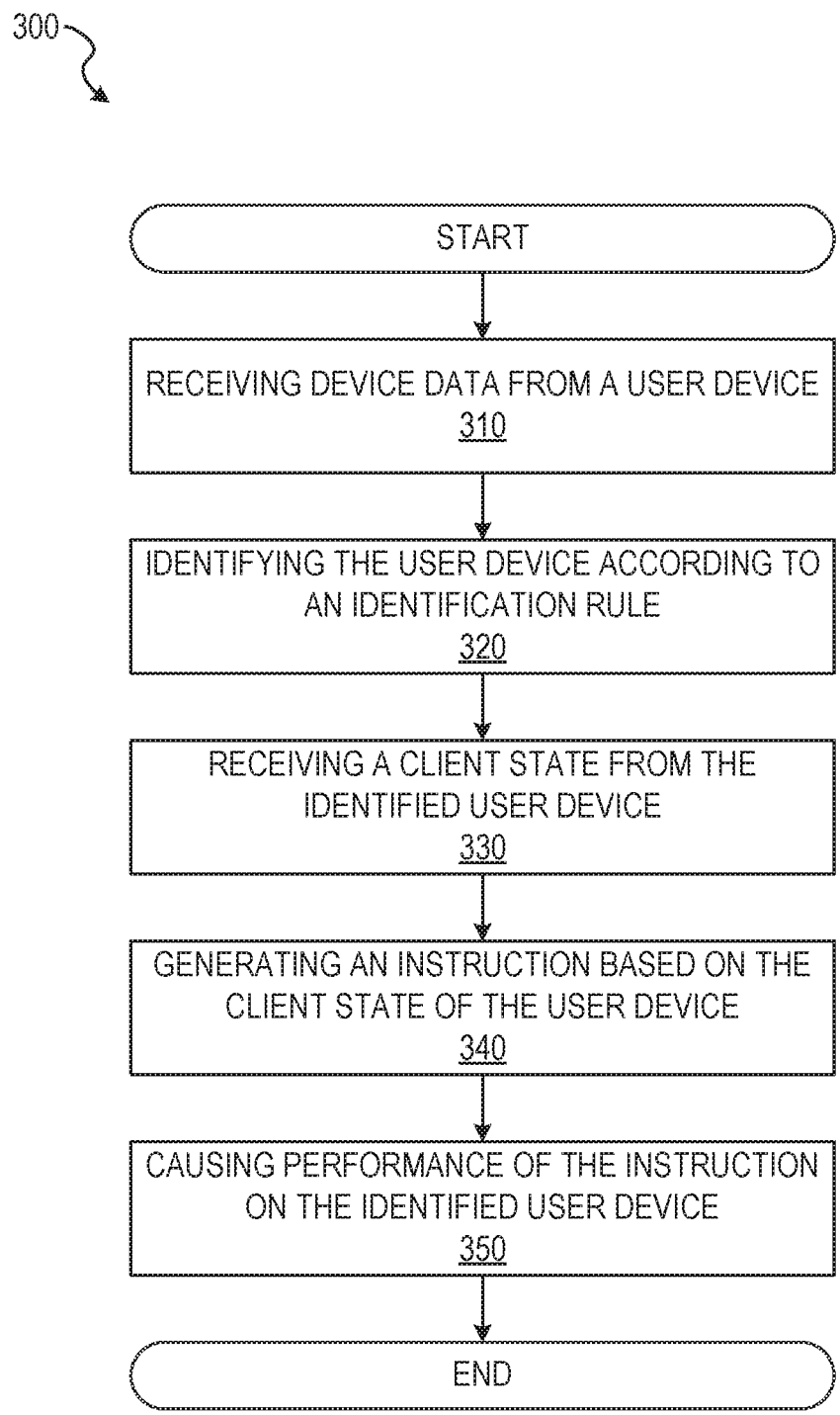
FIG. 3 is a flow diagram illustrating an example method for centralized management of client applications, according to some example embodiments.

FIG. 3 is a flow diagram illustrating an example method 300 for centralized management of client applications. The operations of the method 300 may be performed by components of the management system 150, and are so described below for the purposes of illustration.

At operation 310, the communication module 220 receives device data from a user device indicating a device attribute of the user device (e.g., a particular version of a particular application installed on the user device). For instance, the device data includes the device attribute or the identification module 230 extracts or infers the device attribute from the device data (e.g., the identification module 230 infers demographic information about the user of the user device based on a social network member identification mapped to a device identifier of the user device included in the device data). The device data can comprises various data pertaining to the user device such as an operating system running on the user device, apps installed on the user device, a device model, a device identifier, a geolocation or locale of the user device, a language setting of the user device, app version of a particular app on the user device, user identifier associated with users of the user device (e.g., social networking service identifiers or other online account login identifiers), and a variety of other data pertaining to the user device.

In example embodiment, the communication module 220 queries the user device for the device data. For instance, the communication module 220 sends a request to the user device requesting device data accessible by the user device, and in response to receiving the request, the user device accesses the device data and transmits the accessed device data to the communication module 220. In some instances, the request sent by the communication module 220 specifies a type of data to access or a location of a data store to access, and the user device access the data according to the specification included in the request. In this way, the user device may determine which data to access and transmit to the communication module 220 in response to a request for device data.

At operation 320, the identification module 230 identifies the user device according to an identification rule specified by an operator, manger, or administrator of the management system 150. In various example embodiments, the identification rule specifies a particular device attribute. For example, the identification rule can specify a particular operating system, device model, or another attribute of the user device (e.g., a device of a particular model number), a user of the user device (a device with more than one user or a user matching particular demographic data), an environment of the user device (e.g., an ambient temperature around the device, a geolocation of the device or an altitude of the device). In this example, the identification module 230 determines a match, or near match, between the operating system, device model, or another attribute included in the identification rule with an attribute associated with the user device (e.g., a particular attributed included in the device data received) to identify the user device. In a specific example, the identification module 230 identifies a plurality of user devices running a particular version of an app that has not been opened within a specified time period (e.g., opened within the last seven days). In another example, the identification module 230 identifies devices that are within an operator specified geographic region (e.g., within a predetermined distance of a particular geolocation). In yet another example, the identification module 230 identifies devices associated with operator specified user identifiers (e.g., social networking service member identifiers).

At operation 330, the state module 240 receives a client state from the identified user device. In various example embodiments, the client state indicates a status of a task (e.g., whether a particular process flow has been completed on the user device within a certain time period). In some embodiments, the client state can be stored in a data file on the user device and is transmitted by the user device to the management system 150. In some embodiments, the client state includes information pertaining to activities or tasks associated with the user device. For example, the client state can indicate a last time the user opened a particular app, whether a particular process flow has been completed by the user, and so forth.

At operation 340, the instruction module 250 generates an instruction based on the client state of the user device. The state module 240 or the instruction module 250 determines that the client state matches, or nearly matches, a specified state and subsequently generates the instruction based on the client state matching the specified state. For instance, the instruction module 250 generates a particular type of instruction based on the client state matching a specified state (e.g., specified by an operator of the management system 150). In a specific example, the specified state comprises an indication of whether a particular task or process flow has been completed by the user device within a specified time period. As further discussed in connection with FIG. 4 below, in some example embodiments, the instruction module 250 or the state module 240 generates the instruction to include a task or process flow not already completed by the client device as indicated by the client state. For example, the instruction module 250 generates the instruction to includes a password reset process flow, a logout process flow (e.g., cease functioning of an app or browser code until a log out of a specified account is performed on the user device), or another security change flow (e.g., receiving a user specification of a privacy setting or a security setting pertaining to a particular app or online account). In an example embodiment, the instruction module 250 generates such process flows to include a series of user interfaces to be presented to the user. In other example embodiments, the instruction module 250 causes automatic performance of the instruction on the user device (e.g., a change to a security setting of an app on the user device).

At operation 350, the instruction module 250 or the presentation module 210 causes performance of the generated instruction on the identified user device. For instance, the generated instruction may include a password reset process flow that includes a series of user interface, generated by the presentation module 210, that are caused to be presented on the user device by the presentation module 210 (e.g., providing the user with an option to perform the process flow and receive user input, such as a new password, from the user to complete the process flow). In another instance, the instruction module 250 automatically causes performance of the instruction on the user device on behalf of the user (e.g., automatically changing or modifying a security setting of the client application). The instruction module 250 in conjunction with the presentation module 210 may causes presentation of the generated user interface on the user device of the user. In some instances, the user device performs the instruction in conjunction with, or according to, a management SDK or management library included in the client app. For example, the management SDK can include a variety of functions that can change or modify the client app or the user device.

In an example, the instruction comprises a message or notification that includes information to be presented to the user of the user device (e.g., a message indication a service being down for maintenance). In some embodiments, the instruction module 250 generates the instruction based on the device data. For instance, if the device data indicates that a particular device has a particular language setting, the instruction module 250 generates the notification or message in the language indicated by the device data.

Figure 4:
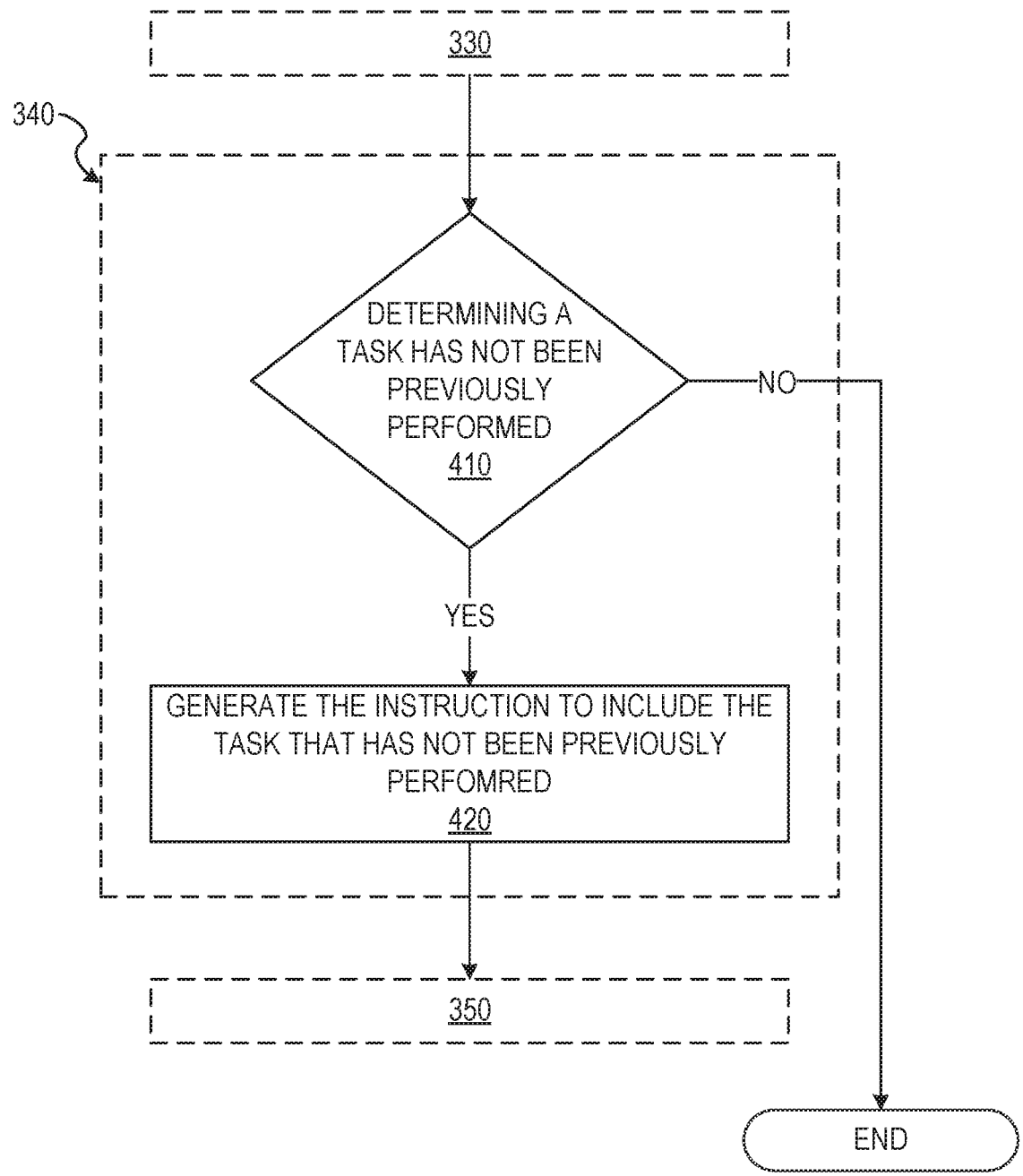
FIGS. 4 and 5 are flow diagrams illustrating further example operations of the example method for centralized management of client applications, according to some example embodiments.

Referring now to FIG. 4, a flow diagram illustrating further example operations for centralized management of client applications is shown. In particular, FIG. 4 discusses an example embodiment of operation 340 in greater detail. Subsequent to the state module 240 receiving the client state from the identified user device at operation 330, in an example embodiment, the instruction module 250 generates the instruction based on the client state at operation 340. In some embodiments, operation 340 includes the additional operation of FIG. 4.

At operation 410, the state module 240 determines a task that has not been previously performed by the user device as indicated by the client state. For instance, the user device may not have previously performed a password reset since an update of a particular app on the user device or another event on the user device. In another instance, the client app on the user device may not have configured a particular security or privacy setting (e.g., the user specifying a particular privacy or security level, allowing the sharing of particular user content, or allowing access to certain internet resources associated with a particular security risk). In some embodiments, the state module 240 determines that the task has not been previously performed for a time period (e.g., forever, within the last month, or since a specified time or a specified event). The time period can be specified by the operator of the management system 150 or dynamically determined by the state module 240. For example, the time period can be determined based on the client state (e.g., a time period starting at a time when a particular flag or indication of the client state has been set by an operator of the management system 150).

At operation 420, the state module 240 generates the instruction to include the task that has not been previously performed by the user device for a time period. For example, if the client state indicates that a particular process flow (e.g., a password reset process flow) has not been performed by the user device for a time period, the instruction module 250 generates the instruction to include the particular process flow. In another example, if the client state indicates that a particular notification has not been received or presented by the user device, the instruction module 250 generates the instruction to include the notification.

Figure 5:
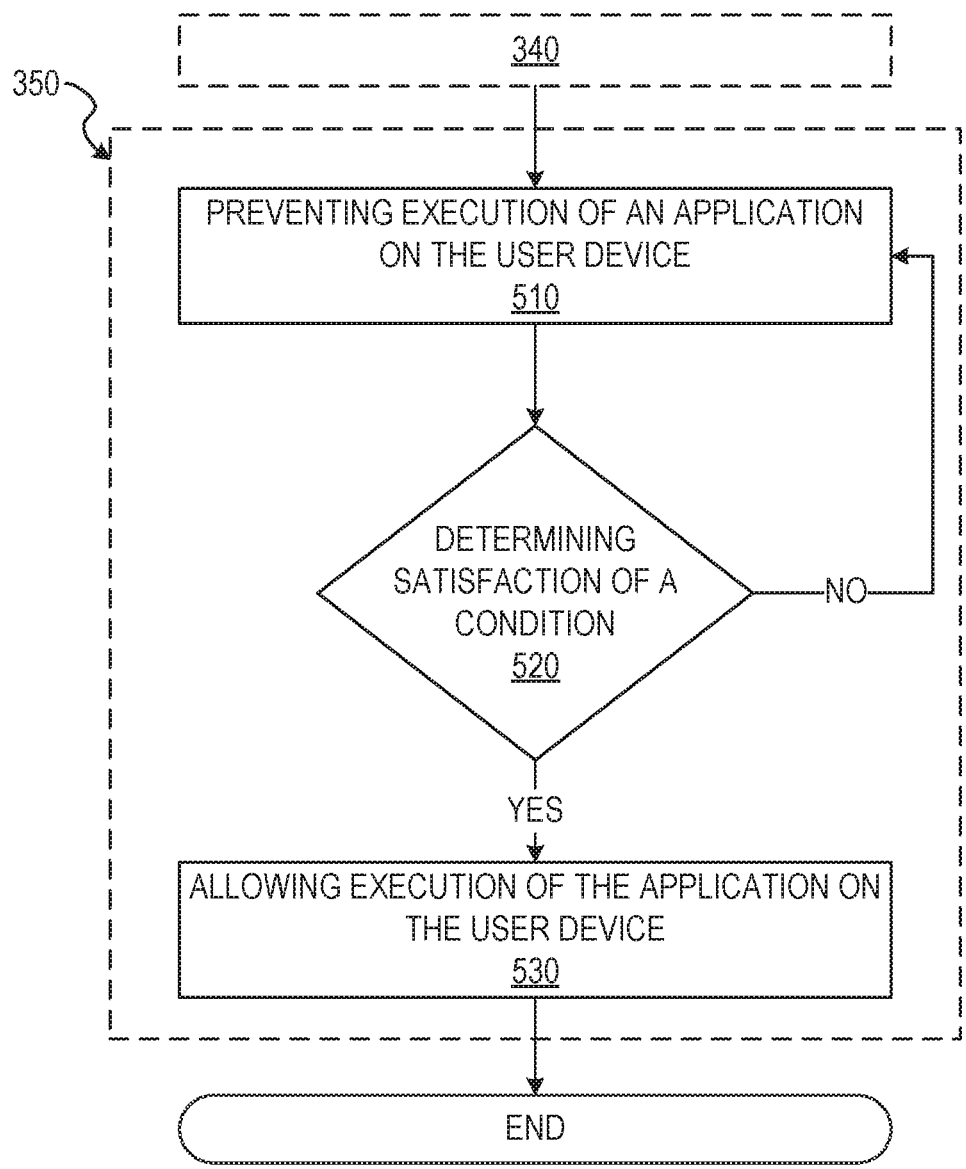

Referring now to FIG. 5, a flow diagram illustrating further example operations for centralized management of client applications is shown. In particular, FIG. 5 discusses an example embodiment of operation 350 in greater detail. At operation 340, the instruction module 250 generates an instruction based on the client state of the user device. Subsequently, at operation 350, the instruction module 250 causes performance of the generated instruction on the identified user device. In some embodiments, operation 350 includes the additional operations of FIG. 5 as will be discussed below.

At operation 510, the instruction module 250 prevents execution of, or impedes use of, a client app, or another piece of software, on the user device. For example, the instruction causes presentation of a user interface (e.g., a mobile browser that includes a user interface or a native mobile operating system user interface) that is overlaid on top of the client app user interface preventing the user from interacting with the client app user interface. The user interface may indicate that the client app is not currently executable and may indicate a corresponding reason. In other embodiments, the instruction disables the client app or a portion of the functionality of the client app until satisfaction of a particular condition. For instance, the condition can comprise completing a process flow such as performing a password reset. That is to say, in an example embodiment, the instruction module 250 prevents execution of a particular app until a particular process flow is completed such as a password reset process flow.

At operation 520, the instruction module 250 determines satisfaction of a condition. In some embodiments, the instruction includes the condition or multiple conditions. In an example, the condition is satisfied by the user device completing a process flow (e.g., password reset). In some embodiments, the user device communicates data that indicates satisfaction of the condition to the instruction module 250. For instance, once the user device completes a password reset process flow, the user device communicates a message indication that the process flow has been completed to the instruction module 250. In other embodiments, the instruction module 250 monitors for satisfaction of the condition by querying the user device, application servers, or other servers for data that indication satisfaction of the condition. In another example, the condition is satisfied by an action such as the user device activating a link to a particular webpage. The condition can include a wide variety of actions and tasks to be performed by the user of the user device. In some instances, the instruction module 250 modifies the client state to indicate that the condition has been satisfied.

At operation 530, the instruction module 250 allows execution of the client app on the user device based on the satisfaction of the condition. For instance, once the instruction module 250 determines the condition is satisfied, the instruction module 250, for example, causes the user interface overlaid on top of the client app user interface to be dismissed or removed, or otherwise enable any functionality previously disabled by the instruction module 250.

Figure 6:
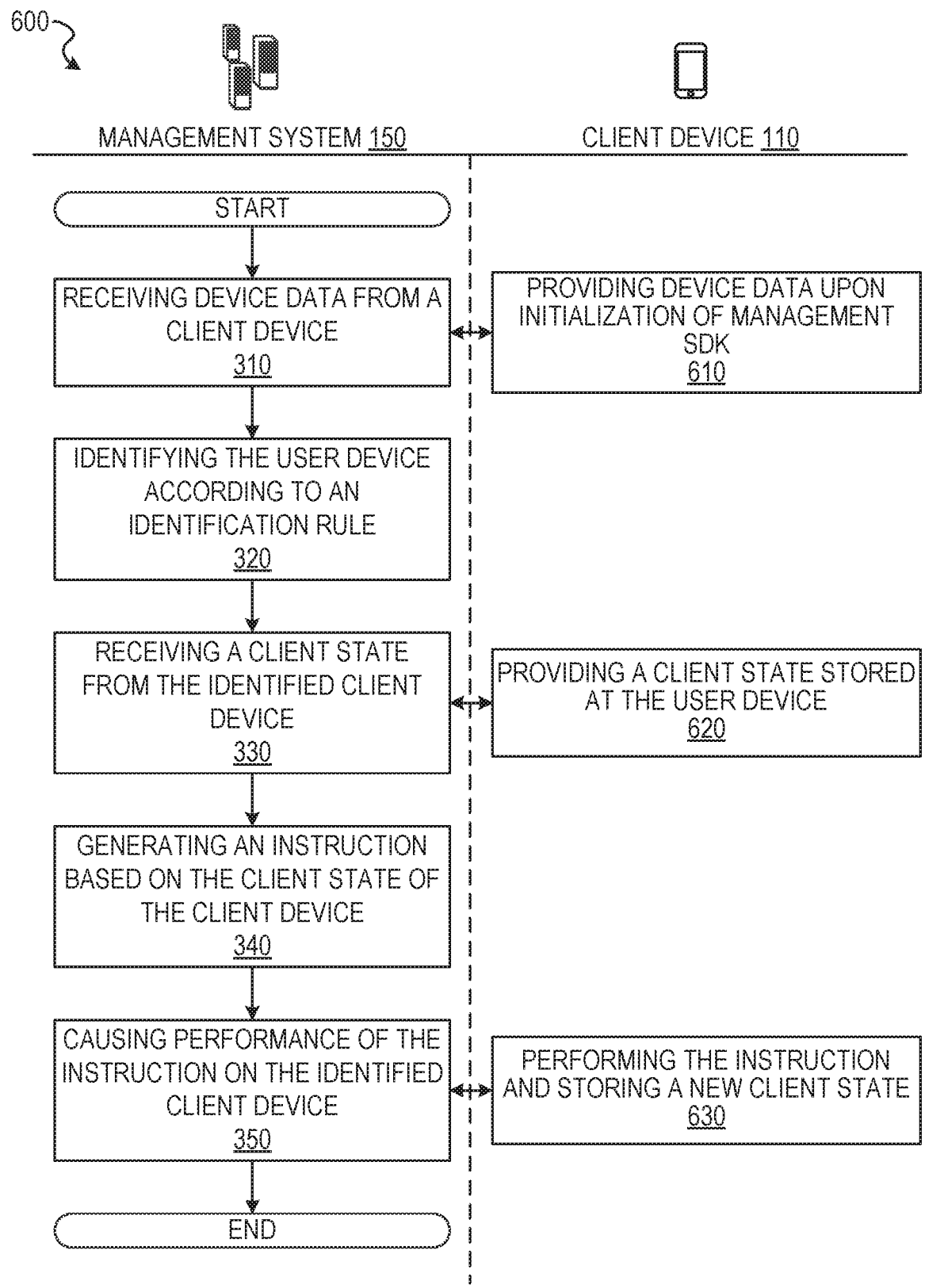
FIG. 6 is a swim-lane diagram illustrating various communications between a client device and the management system, according to some example embodiments.

To illustrate the interactions between the client device and the management system 150, FIG. 6 is a swim-lane diagram 600 showing example operations being performed at various devices. As described above, at operation 310, the communication module 220 receives the device data from the client device 110. As shown in FIG. 6, at operation 610, the client device 110 communicates, transmits, or otherwise provides the device data to the management system 150, for instance, upon initialization of a management SDK included in the client app installed on the device 110. As discussed above in connection with operation 310, the device data comprises, for example, various data pertaining to the user device such as an operating system running on the user device, apps installed on the user device, a device model, a device identifier, a geolocation or locale of the user device, a language setting of the user device, an app version of a particular app on the user device, or a variety of other data pertaining to the user device, a user, or users of the user device, an environment (e.g., physical surroundings of the user device) of the user device, and so forth.

At operation 320, the identification module 230 identifies the client device 110 according to an identification rule. At operation 330, the state module 240 receives a client state from the identified client device 110. As such, at operation 620, the client device 110 communications, transmits, or otherwise provides the client state stored at the client device 110. As discussed above in connection with operation 330, in some embodiments, the client state includes information pertaining to activities of the user device. In a specific example, the client state indicates a last time the user opened a particular app, whether a particular process flow has been completed by the user, and so forth.

At operation 340, the instruction module 250 generates an instruction based on the client state of the client device 110. At operation 350, the instruction module 250 or the presentation module 210 causes performance of the instruction on the identified client device 110. The instruction module 250 communicates, transmits, or otherwise provides the instruction to the client device 110. At operation 630, upon receiving the instruction, the client device 110 performs or executes the instruction. In some instances, the instruction causes a change in the client state and the client device 110 stores a new client state in response to the change. The new client state may be subsequently provided to the management system 150.

Figure 8:
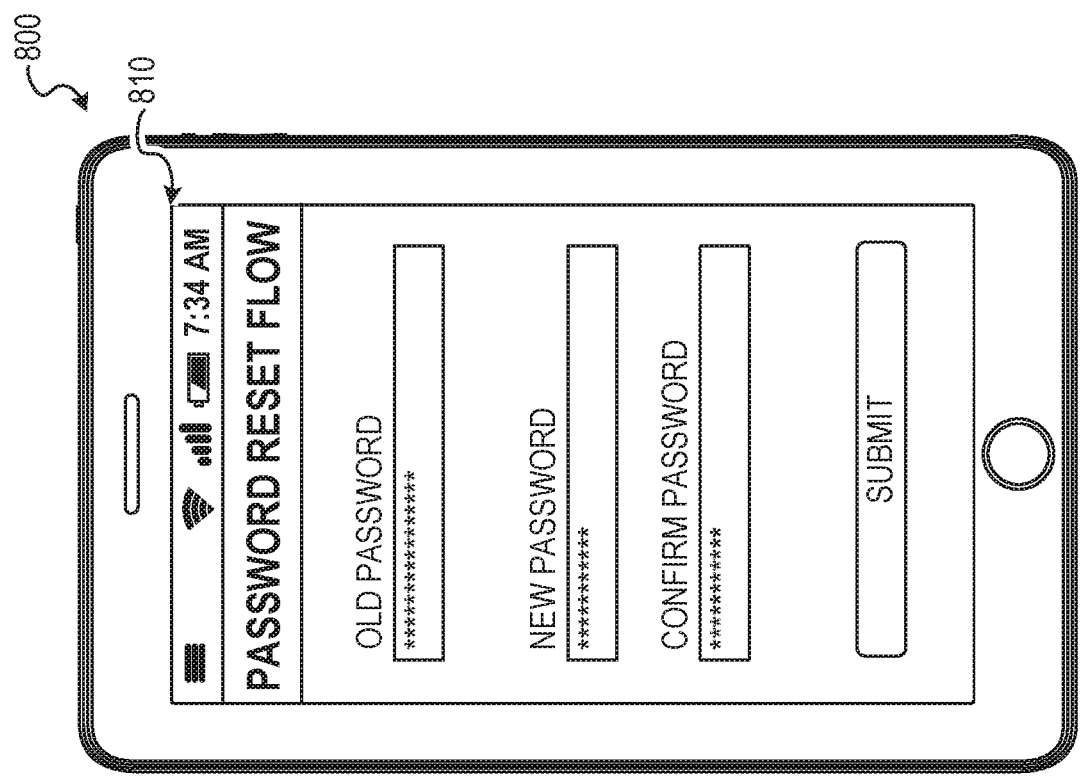
FIGS. 7-8 are user interface diagrams depicting various example user interfaces, according to some example embodiments.
Figure 7:
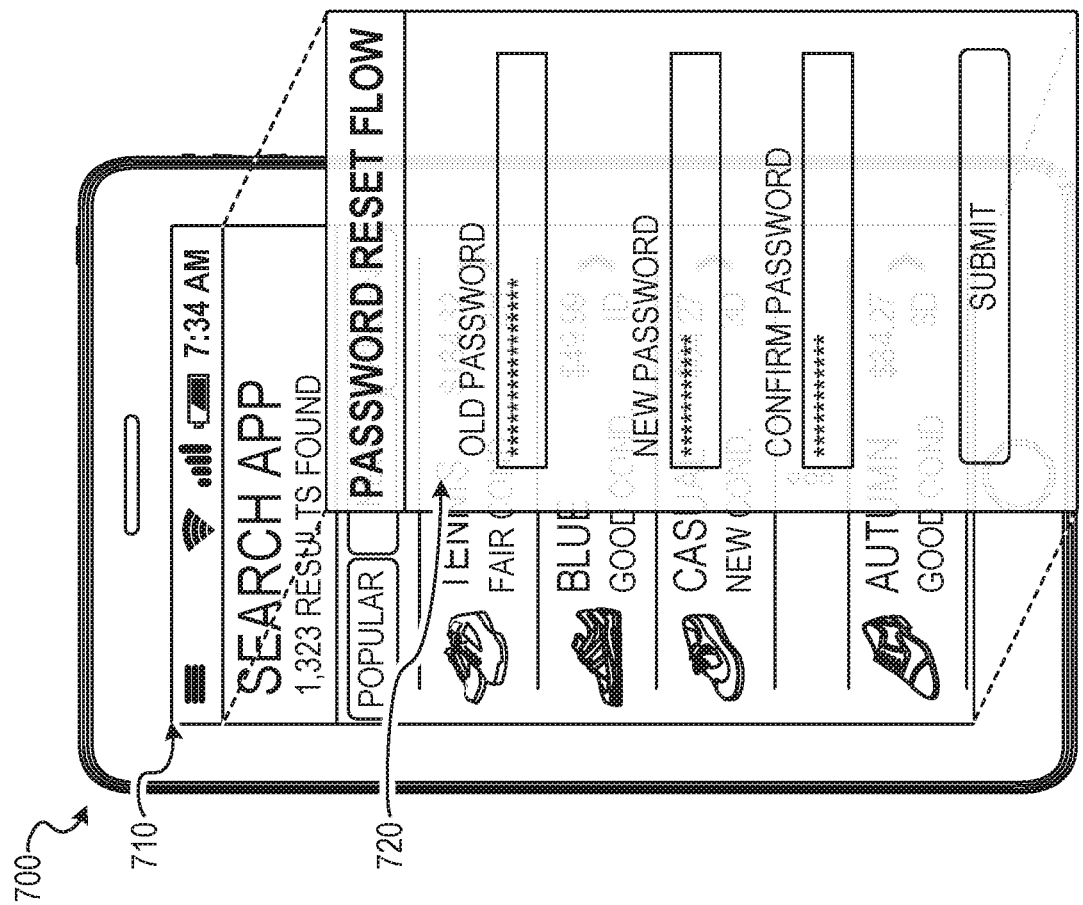

FIGS. 7-8 depict example user interfaces for interactively presenting information to the user. Although FIGS. 7-8 depict specific example user interfaces and user interface elements, these are merely non-limiting examples and many other alternate user interfaces and user interface elements can be generated by the presentation module 210 and cause to be presented to the user. It will be noted that alternate presentations of the displays of FIGS. 7-8 may include additional information, graphics, options, and so forth. Alternatively, other presentations may include less information, or provide abridged information for easy use by the user.

FIG. 7 depicts an example device 700 (e.g., a smart phone) displaying an example user interface 710 that may be generated by the client app executing on the device 700. In an example embodiment, the instruction, generated by the instruction module 250, comprises a process flow (e.g., a series of user interfaces) that prevents operation of the client application until completion of the process flow. For example, the instruction comprises a process flow presented on a second user interface 720. The second user interface 720 can be, for example, a web browser, or a native user interface of the client app, that is overlaid on top of the user interface 710 comprising the client app. In an embodiment, the second user interface 720 includes various user interface elements that the user can interact with to complete a task or action of the process flow. For instance, the second user interface 720 can include user interface elements used to complete a password reset process flow. In other examples, the process flow comprises another type of user-credential information input process flow, a verification or an authorization process flow, or other process flows. In some instance, the presentation module 210 dynamically generates the user interface 720 and the interactive user interface elements included in the user interface 720 and causes the presentation of the user interface 710 on the device 700. In some instances, the user interface 720 can leverage functionality included in the management SDK included in the client app. In this way, the management system 150 causes performance of an instruction on the user device with state stored at the user device without have to perform an update of the client application that may face delays due to the app store approval process.

FIG. 8 depicts an example device 800 displaying an example user interface 810. In this example, the user interface 810 is the user interface 720 as may be seen from the perspective of a user of the user device. As shown in FIG. 8, the user interface 810 covers the user interface generated by the client app (e.g., user interface 710 from FIG. 7) executing on the user device and prevents or impedes operation of the client app.

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 9:
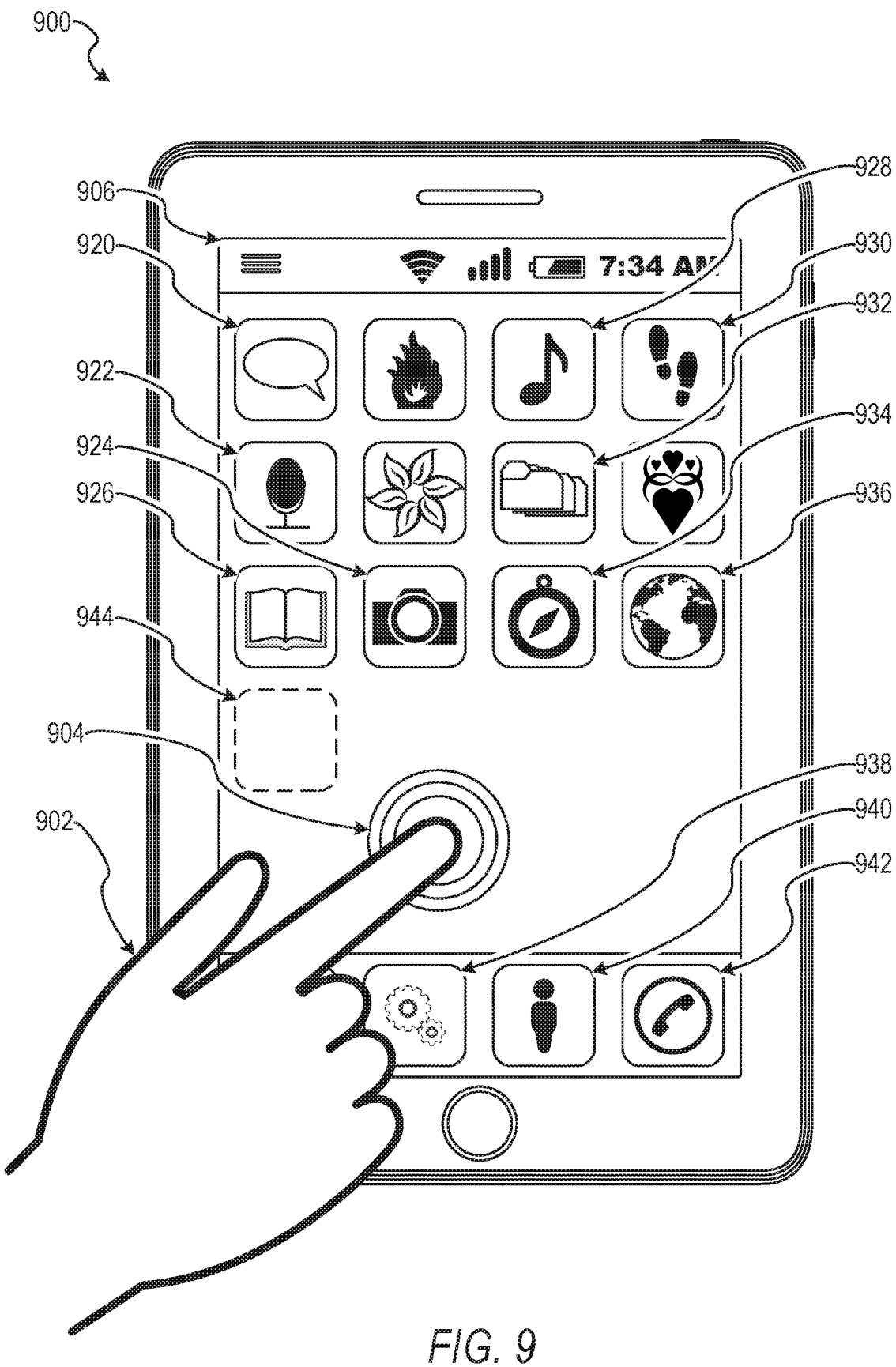
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® PHONE, or another mobile operating systems), according to example embodiments. In one embodiment, the mobile device 900 includes a touch screen operable to receive tactile data from a user 902. For instance, the user 902 may physically touch 904 the mobile device 900, and in response to the touch 904, the mobile device 900 can determine tactile data such as touch location, touch force, or gesture motion. In various embodiments, the mobile device 900 displays a home screen 906 (e.g., Springboard on IOS™) operable to launch applications or otherwise manage various aspects of the mobile device 900. In some embodiments, the home screen 906 provides status information such as battery life, connectivity, or other hardware statuses. The user 902 can activate user interface elements by touching an area occupied by a respective user interface element. In this manner, the user 902 interacts with the applications. For example, touching the area occupied by a particular icon included in the home screen 906 causes launching of an application corresponding to the particular icon.

Many varieties of applications (also referred to as "apps") can be executing on the mobile device 900, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app 920, an audio recording app 922, a camera app 924, a book reader app 926, a media app 928, a fitness app 930, a file management app 932, a location app 934, a browser app 936, a settings app 938, a contacts app 940, a telephone call app 942, or other apps (e.g., gaming apps, social networking apps, biometric monitoring apps). In another example, the mobile device 900 includes a third party app 944 that, consistent with some embodiments, incorporates aspects of embodiments described herein.

Figure 10:
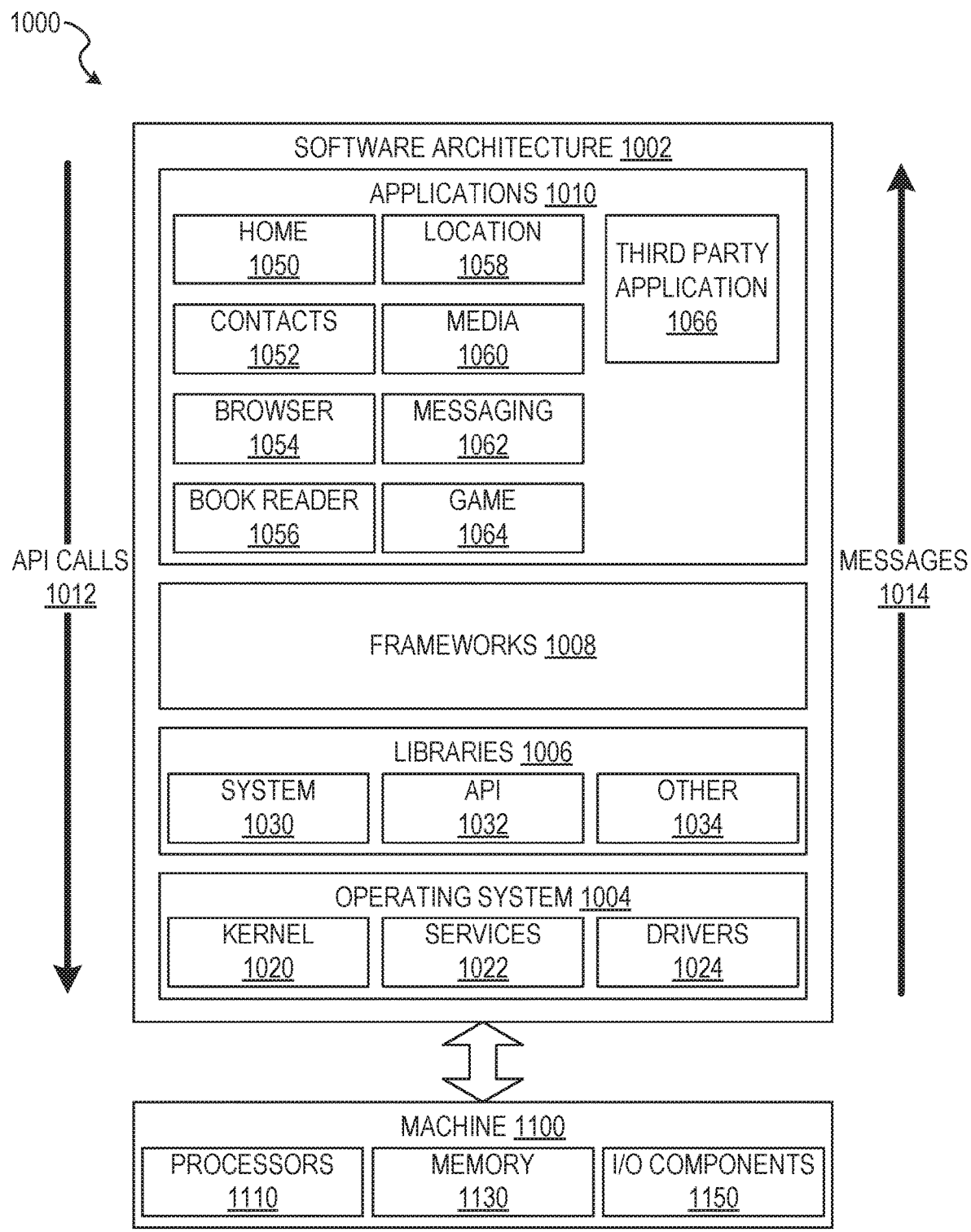
FIG. 10 is a block diagram illustrating an example of a software architecture that may be installed on a machine, according to some example embodiments.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and I/O components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1066 can invoke the API calls 1012 provided by the operating system 1004 to facilitate functionality described herein.

Figure 11:
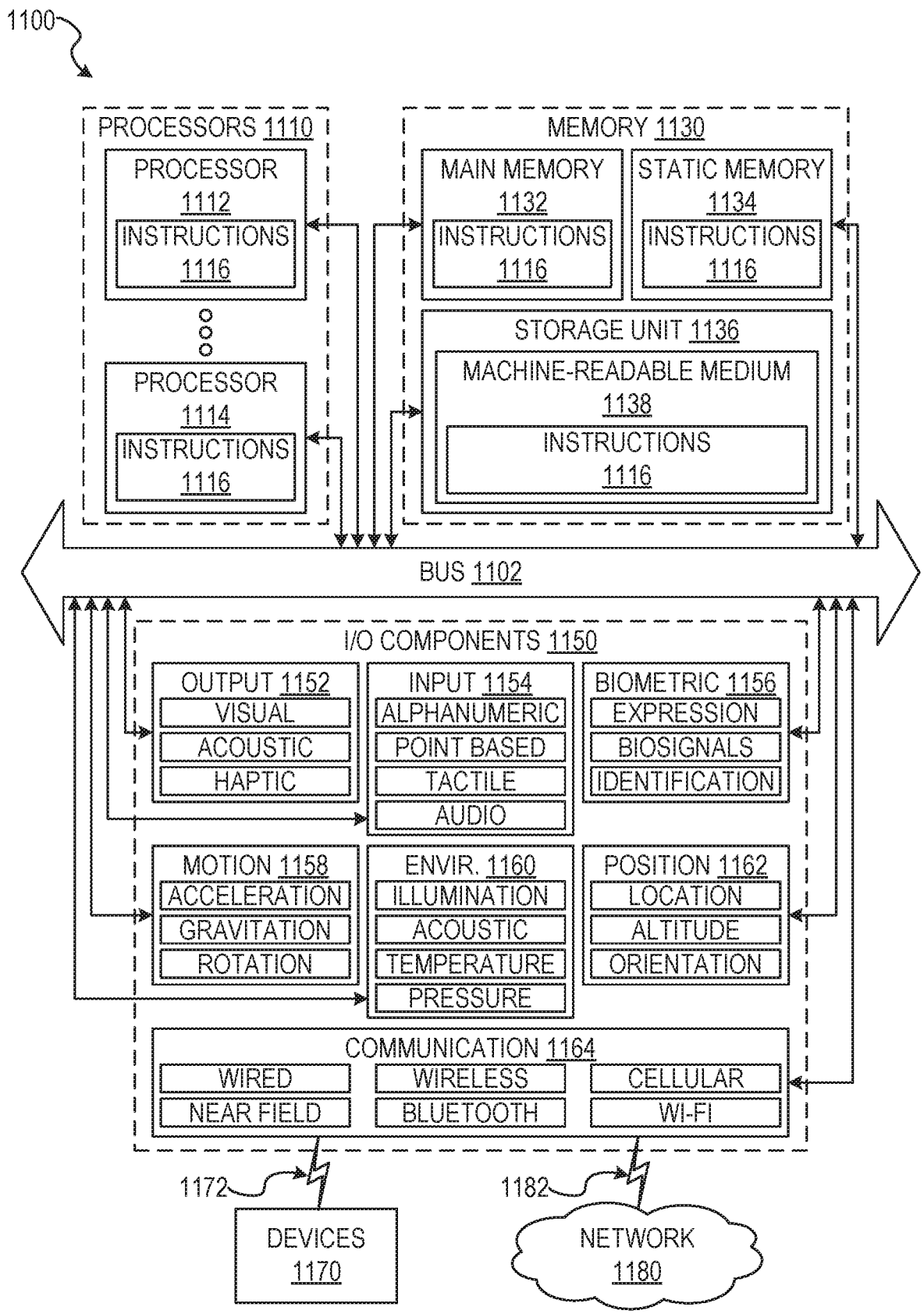
FIG. 11 is a block diagram presenting a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
  receiving, at a management system, a client state from a mobile device, the client state indicating a time a particular application installed on the mobile device was open on the mobile device;
  based upon the received client state, generating, by the one or more hardware processors, a first instruction for the mobile device to change the client state, the first instruction comprising a process flow for changing access to a feature of the mobile device, wherein the process flow for changing access to a feature causes the mobile device to close the particular application;
  communicating the first instruction to the mobile device; and
  causing performance of the first instruction on the mobile device; and
  communicating a second instruction to automatically adjust a setting on the mobile device, wherein the setting relates to a feature of the particular application on the mobile device.

2. The method of claim 1, wherein the first instruction further comprises a message notification indicating that the particular application will be closed.

3. The method of claim 1, wherein the process flow for changing access to the feature further causes the mobile device perform a forced logout on the mobile device.

4. The method of claim 1, wherein the setting is a new password for the mobile device.

5. The method of claim 1, further comprising, receiving device data from the mobile device, the device data comprising location information.

6. The method of claim 1, wherein the second instruction further comprises a reset of application data.

7. A system comprising:
  a management device, the management device comprising a first memory encoding instruction that, when executed by one or more processors of the management device, perform operations comprising:
    receiving, at a management system, a client state from a mobile device, the client state indicating a time a particular application installed on the mobile device was open on the mobile device;
    based upon the received client state, generating, by the one or more hardware processors, a first instruction for the mobile device to change the client state, the first instruction comprising a process flow for changing access to a feature of the mobile device, wherein the process flow for changing access to a feature causes the mobile device to close the particular application;
    communicating the first instruction to the mobile device; and
    communicating a second instruction to automatically adjust a setting on the mobile device, wherein the setting relates to a feature of the particular application on the mobile device; and
  the mobile device comprising a second memory encoding instructions that, when executed by one or more processors of the mobile device, perform operations comprising:
    receiving the first instruction from the management system;
    displaying the message notification of the first instruction;
    executing the process flow for changing access to the feature of the mobile device;
    receiving the second instruction; and
    in response to receiving the second instruction, automatically adjusting the setting.

8. The system of claim 7, wherein the first instruction further comprise a message notification indicating that the particular application will be closed.

9. The system of claim 7, wherein the process flow for changing access to the feature further causes the mobile device perform a forced logout on the mobile device.

10. The system of claim 7, wherein the setting wherein the setting is a new password for the mobile device.

11. The system of claim 10, wherein the setting instructions relates to the feature of the particular application on the mobile device.

12. The system of claim 7, wherein the management device is operable to perform operations further comprising receiving device data from the mobile device, the device data comprising location information.

13. The system of claim 7, wherein the second instruction further comprises a reset of application data.

14. A non-transitory machine-readable medium encoding instruction that, when executed by one or more processors, perform a method comprising:
  receiving, at a management system, a client state from a mobile device, the client state indicating a time a particular application installed on the mobile device was open on the mobile device;
  based upon the received client state, generating, by the one or more hardware processors, a first instruction for the mobile device to change the client state, the first instruction comprising a process flow for changing access to a feature of the mobile device, wherein the process flow for changing access to a feature causes the mobile device to close the particular application;
  communicating the first instruction to the mobile device; and
causing performance of the first instruction on the mobile device; and
  communicating a second instruction to automatically adjust a setting on the mobile device, wherein the setting relates to a feature of the particular application on the mobile device.

15. The non-transitory machine-readable medium of claim 14, wherein the first instruction further comprise a message notification indicating that the particular application will be closed.

16. The non-transitory machine-readable medium of claim 14, wherein the process flow for changing access to the feature further causes the mobile device perform a forced logout on the mobile device.

17. The non-transitory machine-readable medium of claim 14, wherein the setting is a new password for the mobile device.

18. The non-transitory machine-readable medium of claim 17, wherein the setting instructions relates to the feature of the particular application on the mobile device.

19. The non-transitory machine-readable medium of claim 14, wherein the method further comprises, receiving device data from the mobile device, the device data comprising location information.

20. The non-transitory machine-readable medium of claim 14, wherein the second instruction further comprises a reset of application data.

* * * * *